US008873412B2

(12) United States Patent  
Ficet et al.

(10) Patent No.: US 8,873,412 B2  
(45) Date of Patent: Oct. 28, 2014

(54) METHODS AND DEVICES FOR EVALUATING INTERCONNECTION EFFICIENCY OF PARALLEL COMPUTER NETWORKS BASED UPON STATIC ROUTING SCHEMES (75) Inventors: Jean-Vincent Ficet, La Chapelle Blanche (FR); Philippe Couvee, Villard Bonnot (FR); Nicolas Morey-Chaisemartin, Saint-Martin d'Heres (FR)

(73) Assignee: Bull SAS, Les Clayes Sous Bois (FR)

( * ) Notice: Subject to any disclaimer, the term of this patent is extended or adjusted under 35 U.S.C. 154(b) by 165 days.

(21) Appl. No.: 13/379,984

(22) PCT Filed: Jun. 28, 2010

(86) PCT No.: PCT/IB2010/052943  
§ 371 (c)(1),  
(2), (4) Date: Dec. 21, 2011

(87) PCT Pub. No.: WO2011/001362  
PCT Pub. Date: Jan. 6, 2011

(65) Prior Publication Data  
US 2012/0093023 A1   Apr. 19, 2012

(30) Foreign Application Priority Data  
Jul. 2, 2009 (EP) .................................... 09290528

(51) Int. Cl.  
H04L 12/26 (2006.01)  
H04L 12/721 (2013.01)  
H04L 12/24 (2006.01)

(52) U.S. Cl.  
CPC ............... *H04L 41/12* (2013.01); *H04L 45/12* (2013.01); *H04L 45/14* (2013.01)  
USPC ........................................ 370/252

(58) Field of Classification Search  
CPC .................................................. H04L 41/12  
USPC ......... 370/238, 389, 254, 388, 400, 229, 232; 709/220  
See application file for complete search history.

(56) References Cited

U.S. PATENT DOCUMENTS 7,586,909 B1 * 9/2009 Walrand et al. ............... 370/388  
8,243,594 B1 * 8/2012 Fotedar et al. ................ 370/229  
(Continued)

OTHER PUBLICATIONS

Burgess, et al. "Optimisation of irregular multiprocessor computer architectures using genetic algorithms" Department of Computer Science, University of Bristol, England; Annals of Operations Research 86, Mar. 2, 1999, pp. 239-257; XP002544226.

(Continued)

*Primary Examiner* — Asad Nawaz  
*Assistant Examiner* — Parth Patel  
(74) *Attorney, Agent, or Firm* — Knobbe, Martens, Olson & Bear LLP (57) ABSTRACT

Methods and devices for characterizing the interconnection efficiency of a computer network based upon a static routing scheme are disclosed. The network comprises a plurality of items of equipment. After having determined (105) a plurality of types of links between said items of equipment, a theoretical number of routes per link and the associated number of links are determined (120, 125) for each type of at least one subset of said plurality of types of links according to the topology of said network. The determined theoretical number of routes per link and the associated number of links are then aggregated (135) to estimate at least one optimal routing point characterizing the theoretical efficiency of the network. Such optimal routing points can be compared with estimated actual routing points based upon the aggregation of actual numbers of routed per link and associated actual numbers of links to characterizes the network efficiency.

9 Claims, 5 Drawing Sheets

(56) References Cited

U.S. PATENT DOCUMENTS

| | | | |
|---|---|---|---|
| 2003/0028624 A1* | 2/2003 | Hasan et al. | 709/220 |
| 2003/0174653 A1* | 9/2003 | Basu et al. | 370/238 |
| 2004/0218595 A1* | 11/2004 | Acharya et al. | 370/389 |
| 2006/0182034 A1* | 8/2006 | Klinker et al. | 370/238 |
| 2008/0225716 A1* | 9/2008 | Lange | 370/232 |
| 2008/0239991 A1* | 10/2008 | Applegate et al. | 370/254 |
| 2010/0014528 A1* | 1/2010 | Amir et al. | 370/400 |

OTHER PUBLICATIONS

Bekhor, et al. "Effects of choice set size and route choice models on path-based traffic assignment" Transportmetrica, Hong Kong Society for Transportation Studies, HK, vol. 4 No. 2, Jan. 8, 2008, pp. 116-133; XP002544227.

Vishnu, et al. "Performance Modeling of Subnet Management on Fat Tree Infiniband Networks using OpenSM" Parallel and distributed processing symposium, 2005. $19^{th}$ IEEE International Denver, CO; Apr. 4, 2005; pp. 1-8.

Johnson, et al. "Optimization of Infiniband for Scientific Applications" Parallel and Distributed Processing, 2008; IEEE International Symposium, Piscataway NJ, Apr. 14, 2008, pp. 1-8.

Gomez, et al. "Beyond—Fat-tree: Unidirectional Load-Balanced Multistage Interconnection Network", IEEE Computer Architecture Letters, vol. 7 No. 2, Feb. 1, 2008; pp. 49-52.

International Search Report for PCT/IB2010/052943; mailed Sep. 3, 2010.

* cited by examiner

METHODS AND DEVICES FOR EVALUATING INTERCONNECTION EFFICIENCY OF PARALLEL COMPUTER NETWORKS BASED UPON STATIC ROUTING SCHEMES

CROSS-REFERENCE TO RELATED APPLICATIONS

This application is a U.S. National Phase under 35 U.S.C. §371 of International Application PCT/IB2010/052943, filed Jun. 28, 2010, which designated the U.S., and which claims priority under 35 U.S.C. §119 to EP Patent Application Number 09290528.0, filed on Jul. 2, 2009. The disclosures of the above-described applications are hereby expressly incorporated by reference in their entireties.

The present invention relates generally to methods and systems for evaluating performances of parallel computer networks and more specifically to methods and systems for evaluating interconnection efficiency of parallel computer networks based upon static routing schemes.

In a parallel computer provided with a plurality of nodes including a processor, the nodes are connected to each other by a topology network such as a fat-tree by switching means. Nodes may be of different natures. For example, computation nodes are used to execute user's tasks while service oriented nodes handle specific tasks such as network management, storage, input/output and the likes.

In the last years, node interconnections of the Infiniband type has become a popular interconnection model for very large clusters, that is to say for groups of linked computers working together closely, due to its performances in providing low latency and high bandwidth.

Infiniband is a packet-switching network based on an extensive specification defined by the Infiniband Trade Association. However, as it was not primary designed for HPC (High Performance Computing), it lacks some features such as dynamic routing.

The InfiniBand Architecture (IBA) specifies that routing should be performed by an external software agent generally called subnet manager. Because routing in Infiniband networks is destination based, a routing table must be set up within every switch in the network, also called fabric. OpenSM, an open source subnet manager, provides many network services, including routing algorithms for that purpose. For example, OpenSM provides the routing algorithms known as min-hop, up/down and fat-tree.

Since static routing can result in contention in the network, hence limiting the overall network efficiency, the routing should be set up carefully.

As mentioned above, the Infiniband architecture relies upon a static routing scheme. Therefore, efficient routing techniques are mandatory to overcome the lack of an adaptive routing feature. However, in order to characterize the routing efficiency achieved by these algorithms, it is necessary to run a wide variety of benchmarks.

Furthermore, despite the good MTBF (Mean Time Between Failures) figures of the Infiniband items of equipment, the failure rate can no longer be neglected in petascale clusters. Also, static routing emphasizes the cluster sensitivity to network deteriorations. Therefore, assessing the impact of equipment loss is mandatory for the cluster interconnect sustainability and usability.

Therefore, there is a need to provide a method and system for evaluating interconnection efficiency of parallel computer networks based upon static routing schemes, in particular for evaluating Infiniband topology and routing efficiency.

Thus, it is a broad object of the invention to remedy the shortcomings of the prior art as described here above.

The accomplishment of these and other related objects is achieved by a method for characterizing a theoretical interconnection efficiency of a parallel computer network based upon a static routing scheme, the parallel computer comprising a plurality of items of equipment, the method comprising the following steps:
  determining a plurality of types of links between said items of equipment;
  for each type of at least one subset of said plurality of types of links:
    determining a theoretical number of routes per link according to the topology of said parallel computer network; and
    determining the associated number of links according to the topology of said parallel computer network; and
  aggregating said determined theoretical number of routes per link and said associated number of links to estimate at least one optimal routing point, said at least one estimated optimal routing point characterizing the theoretical efficiency of said parallel computer network.

The method of the invention thus allows determining theoretical references that can be used to evaluate the efficiency of an actual parallel computer network configuration. More precisely, the method of the invention makes it possible to characterize a theoretical interconnection efficiency of a parallel computer network comprising several hundreds of items of equipment and several thousands or hundreds of thousands of links by only few reference values.

According to a particular embodiment, the method further comprises a step of plotting said at least one optimal routing point on a graph so as to provide a visual representation of the theoretical references that can be used to evaluate the efficiency of an actual parallel computer network configuration.

It is another object of the invention to provide a method for characterizing the interconnection efficiency of a parallel computer network based upon a static routing algorithm, the parallel computer comprising a plurality of items of equipment, the method comprising the following steps:
  determining at least one optimal routing point according to the method described above;
  for each type of said at least one subset of said plurality of types of links,
    determining the actual number of routes per link according to the topology of said parallel computer network and to said routing algorithm; and
    determining the associated actual number of links according to the topology of said parallel computer network; and
  aggregating said determined actual number of routes per link and said associated actual number of links to estimate at least one actual routing point, said at least one estimated actual routing point characterizing the efficiency of said parallel computer network in view of said at least one optimal routing point.

Thus, the method of the invention makes it possible to evaluate the efficiency of a parallel computer network by simply comparing actual routing characteristics with optimal routing characteristics.

According to a particular embodiment, the method further comprises the step of modifying at least one parameter of said topology and of repeating said steps of:
  for each type of said at least one subset of said plurality of types of links:

determining the modified actual number of routes per link according to the modified topology of said parallel computer network and to said routing algorithm; and determining the modified associated actual number of links according to the modified topology of said parallel computer network; and aggregating said determined modified actual number of routes per link and said modified associated actual number of links to estimate at least one modified actual routing point, said at least one estimated modified actual routing point characterizing the efficiency of said modified parallel computer network in view of said at least one optimal routing point and/or of said at least one actual routing point.

Thus, the method of the invention makes it possible to optimize the topology of a parallel computer network by modifying at least one of its parameter and by simply comparing modified actual routing characteristics with optimal routing characteristics and/or actual routing characteristics.

Still according to a particular embodiment, said step of modifying said topology comprises the step of logically removing at least one equipment of said parallel computer network. Thus, the method of the invention makes it possible to estimate the efficiency of a parallel computer network facing failure by modifying at least one of its parameter to simulate failure and by simply comparing modified actual routing characteristics with optimal routing characteristics and/or actual routing characteristics.

Still according to a particular embodiment and to simulate the failure of a particular type of equipment, the method further comprises the step of repeating said steps of estimating said at least one modified actual routing point for simulating the failure of an equipment of said at least one equipment type. Thus, the method of the invention makes it possible to determine the efficiency of the parallel computer network facing a failure of a particular type of equipment.

Still according to a particular embodiment, the method further comprises the step of modifying at least one parameter of said routing algorithm and of repeating said steps of:

for each type of said at least one subset of said plurality of types of links:

determining the modified actual number of routes per link according to the topology of said parallel computer network and to said modified routing algorithm; and determining the modified associated actual number of links according to the topology of said parallel computer network; and aggregating said determined modified actual number of routes per link and said modified associated actual number of links to estimate at least one modified actual routing point, said at least one estimated modified actual routing point characterizing the efficiency of said modified parallel computer network in view of said at least one optimal routing point and/or of said at least one actual routing point.

Thus, the method of the invention makes it possible to optimize the routing algorithm of a parallel computer network by modifying at least one of its parameter and by simply comparing modified actual routing characteristics with optimal routing characteristics and/or actual routing characteristics.

The method of the invention preferably further comprises the step of plotting said routing points on a same graph so that the efficiency of a parallel computer network can be visually and quickly determined.

Said at least one subset of said plurality of types of links preferably comprises all the types of links of said plurality of types of links so that the parallel computer network efficiency is evaluated taking into consideration the whole parallel computer network.

Still according to a particular embodiment, said steps of determining an actual number of routes per link and of determining an associated actual number of links are executed during the simulation of said parallel computer network so as to optimize the computation task when evaluating the efficiency of the parallel computer network.

It is another object of the invention to provide a computer program comprising instructions for carrying out each step of the method described above when the program is loaded and executed by a programmable device and an apparatus comprising means adapted for carrying out each step of this method.

The particular characteristics and advantages of the computer program and apparatus for characterizing an interconnection efficiency of a parallel computer network based upon a static routing scheme being similar to those of the method for characterizing an interconnection efficiency of a parallel computer network based upon a static routing scheme, they are not repeated here.

Further advantages of the present invention will become apparent to the ones skilled in the art upon examination of the drawings and detailed description. It is intended that any additional advantages be incorporated herein.

An object of the invention is to characterize the influence of network topologies, degradations and routing algorithms upon the routing efficiency through simulation using a metric based upon numbers of routes per link.

In the following, it is considered that:

the rank of a switch in a fat-tree topology is the minimal distance between this switch and a leaf node, a node being a component other than a switch or a router (typical HPC nodes are computer nodes, I/O servers and administration servers). A switch of rank "i" is called "Li";

an island is a set that contains all the switches of ranks 1 and 2, and their leaf nodes, all of which must be reachable from a leaf node not using any switch of rank 3. A fat-tree with switches of rank 3 or more may contain multiple islands;

a level is a set that contains all the switches of the same rank within an island;

a network level is a set that contains all the switches of the same rank within the interconnect network;

a route describes the path used by network packets between two endpoints. According to OpenSM definitions, a primary route is a route that is configured between two nodes. A route that is not a primary route is referred to as a secondary route (these routes provide some connectivity between switches, routers, etc.). Routes between a node and a switch (or a router) are also referred to as secondary routes;

a link is a physical connection between two switches or between a switch and a node; and the number of routes per link is the number of primary routes that go through a link.

It should be noted that a primary route is directly involved in the transfer of data that is useful from a user point of view. The volume of traffic going through primary routes is high and depends upon the profile of the applications running on the cluster and its load.

A secondary route is only used for subnet management purposes. Basically, it allows subnet manager packets to configure the Infiniband routing tables in the switches and to collect the performance counters. Secondary routes can also be used for other management purposes, but the volume of traffic going through these routes is usually low and invisible to the end user.

Since interconnect performances are generally those as seen from a user point of view, only the primary routes are taken into account for determining the routing efficiency in the following. However, secondary routes may also be taken into account in the same way.

To assess routing efficiency, the method of the invention is based upon the comparison between the numbers of routes produced by the subnet manager with the number of optimal routes.

To determine the number of optimal routes, it is assumed that the nodes communicate homogeneously between each other. Such assumption is used by OpenSM in the current implementation of the fat-tree algorithm and it enables to achieve good performance in most situations.

Communications being here considered as homogeneous, an optimal routing scheme should obtain an equal load on every link of the interconnect network. In other words, the routing algorithm should spread the routes on every link, at each level within the fat-tree, so that the load of each link is approximately the same. As the exact communication scheme and the volume of traffic on each route cannot be determined in advance, the load of a link is assessed according to a number of routes per link metric.

In an optimally routed network, for any couple of adjacent levels, the number of routes per link is the same for all links connecting these levels. In the case of an homogeneous fat-tree, this can be extended to network levels (interconnect wide). Since Infiniband links are full duplex, each link has two different kinds of routes per link, one in each direction.

Figure 1:
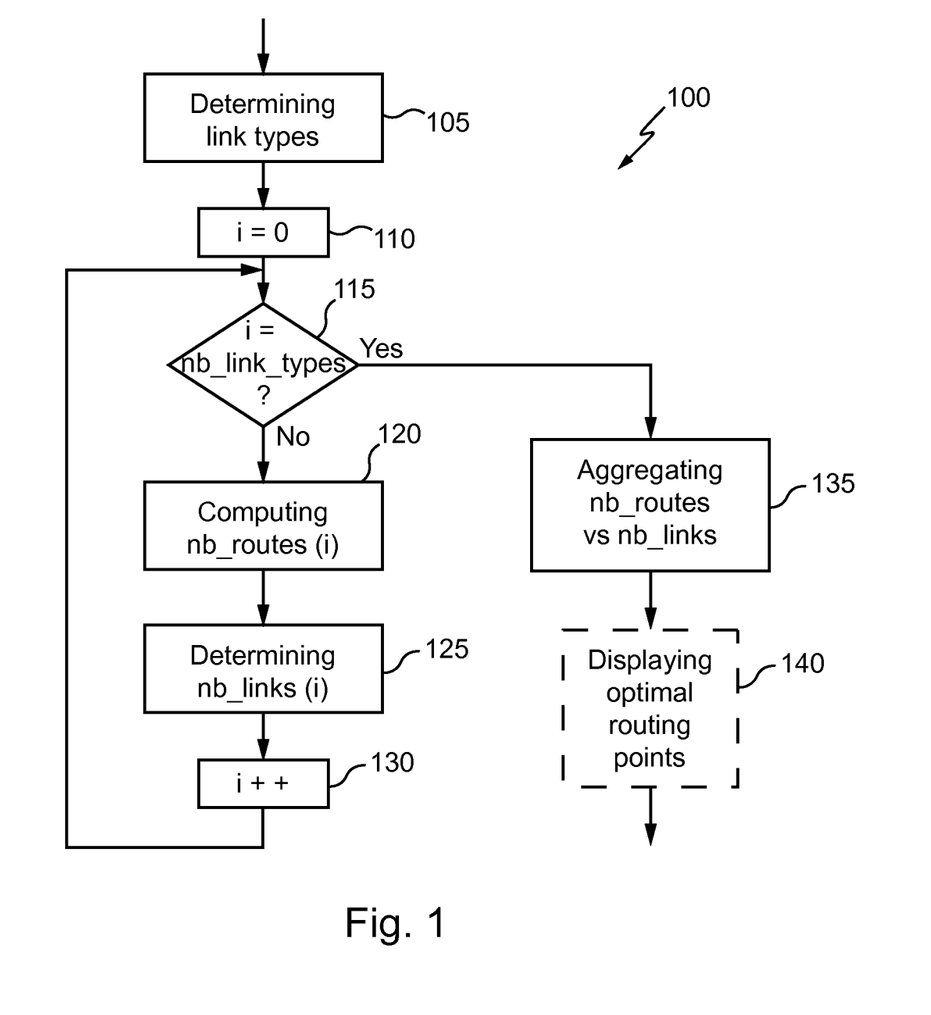
FIG. 1 illustrates an example of an algorithm for characterizing the optimal efficiency of a network topology of the Infiniband type.

FIG. 1 illustrates an example of an algorithm 100 for characterizing the optimal efficiency of a network topology of the Infiniband type. As illustrated, a first step consists in determining types of links (step 105). For sake of illustration, the types of links can be defined according to some characteristics of the destination or source switch. In particular, the types of links can be defined according to the rank of the destination or source switch and the island to which it belongs to. An index i is initialized to zero (step 110).

Then, a test is performed to determine whether the index i is equal to the number of link types, referred to as nb_link_type, or not (step 115).

If the index i is not equal to the number of link types, the total number of routes per link for links of the i type, referred to as nb_routes(i), is computed (step 210), the number of links of the i type, referred to as nb_links(i), is determined (step 125) and the index i is incremented by one (step 130). The process then loops to step 115.

If the index i is equal to the number of link types (step 115), the obtained number of routes per link and the number of links, for each type of links, are aggregated (step 135). For example, the aggregation can consist in determining the number of links that are associated to each calculated value of routes per link, whatever the link type. The aggregated values are preferably displayed (step 140).

Figure 2:
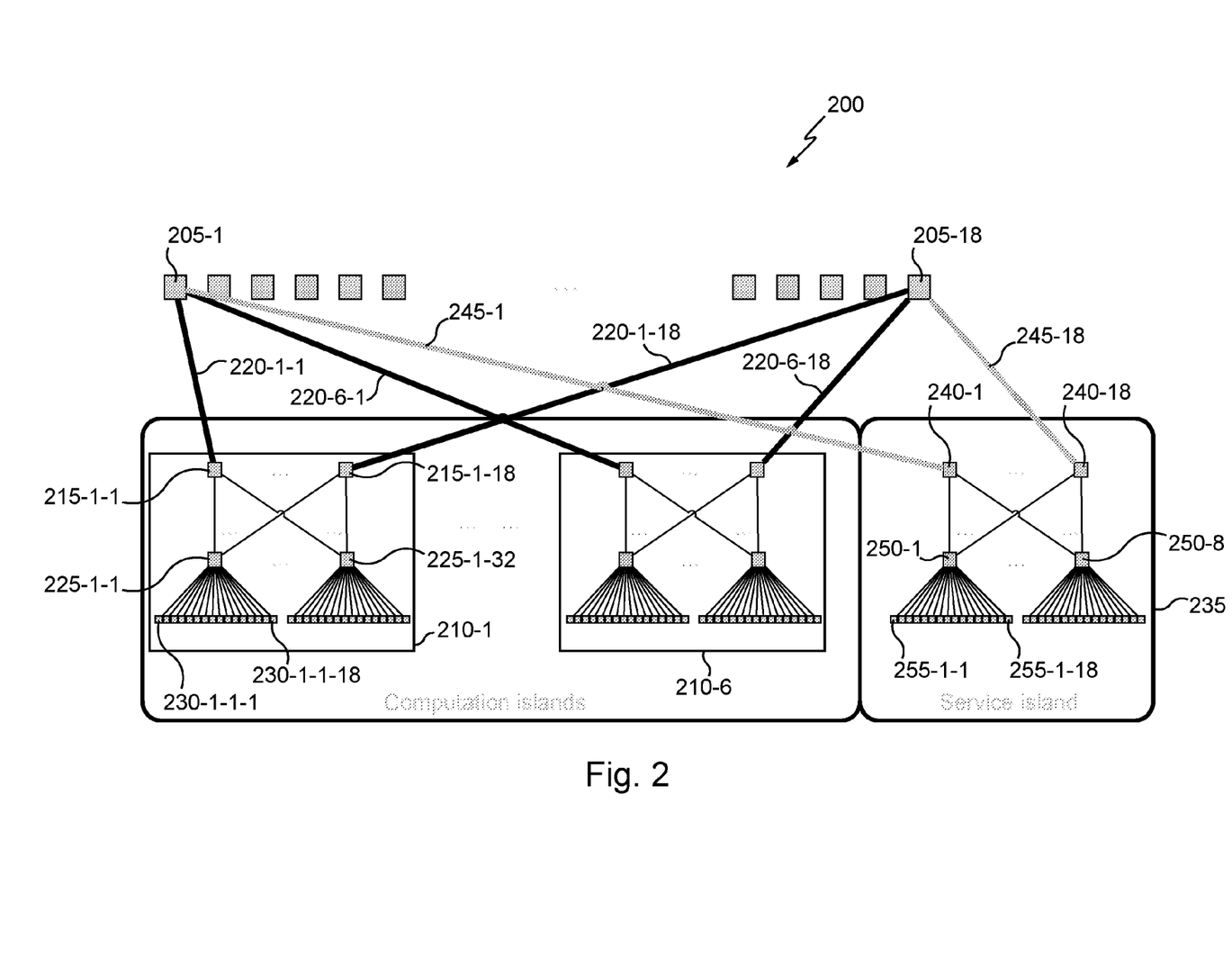
FIG. 2 illustrates an example of an Infiniband network topology of which the routing efficiency can be determined according to the method of invention.
Figure 3:
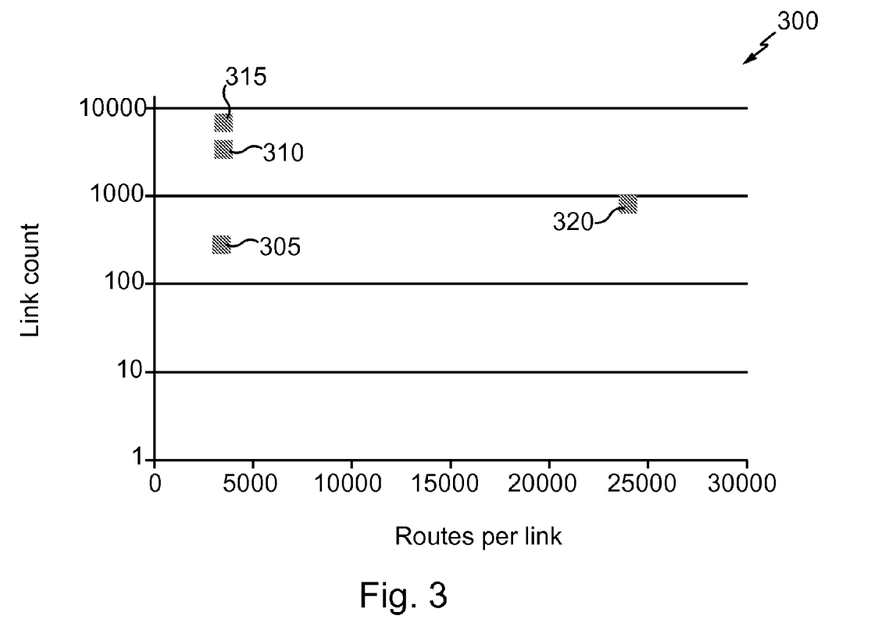
FIG. 3 depicts a graph illustrating a representation of the optimal topology and routing for the network of the Infiniband type illustrated on FIG. 2.

For illustrating the algorithm of FIG. 1, FIGS. 2 and 3 depict an example of an Infiniband network topology and the representation of its efficiency according to the method of the invention.

FIG. 2 illustrates an example of an Infiniband network topology of which the routing efficiency can be determined according to the method of invention.

The illustrated topology 200 is a pruned, that is to say a network topology wherein the number of downlinks is greater than the number of uplinks at a given level, non homogeneous flat-tree comprising:

18 L3 switches 205-1 to 205-18, also called top switches;

6 computation islands (210-1 to 210-6), each computation island 210-*k* comprising:

18 L2 switches (215-*k*-1 to 215-*k*-18) each having 4 uplinks (220-*k*-1 to 220-*k*-18) connected to the L3 switches;

32 L1 switches (225-*k*-1 to 225-*k*-32), also called leaf switch, each L1 switch being connected to the 18 L2 switches of the computation island; and 18 computation nodes per L1 switches that is to say 576 (32×18) computation nodes per island, referred to as 230-*k*-*l*-1 to 225-*k*-*l*-18 wherein k represents the index of the computation island and k represents an index of an L1 switch in the computation island of index k;

1 unpruned service island (235) comprising:

18 L2 switches (240-1 to 240-18) each having 8 uplinks (245-1 to 245-18) connected to the L3 switches;

8 L1 switches (250-1 to 250-8), each L1 switch being connected to the 18 L2 switches of the service island; and 18 service nodes per L1 switches that is to say 144 (8×18) computation nodes per island, referred to as 255-*l*-1 to 255-*l*-18 wherein l represents an index of an L1 switch in the service island.

As can be seen from FIG. 2, six types of links are used in the illustrated topology representing the interconnection between nodes, L1, L2 and L3 switches, for the computation islands and the service island. These six types are the following ones:

for the computation islands:
links between computation nodes and L1 switches;
links between L1 and L2 switches; and
links between L2 and L3 switches;

for the service island:
links between service nodes and L1 switches;
links between L1 and L2 switches; and
links between L2 and L3 switches.

Likewise, the four following types of communication may be identified:
- intra cell communications, that is say communications between two nodes connected to a same L1 switch;
- intra island communications, that is to say communications between two nodes connected to the same L2 switch via their own L1 switch;
- inter island communications, that is to say communications between two nodes connected to the same L3 switch via their own L1 and L2 switches; and
- I/O communications, that is to say communications between a computation node and a service node connected to the same L3 switch via their own L1 and L2 switches.

In view of the network topology illustrated on FIG. 2, it is possible to compute the number of routes per link according the following relation:

$$Nb\_Routes(i, j) = \frac{Nb\_S(i) \cdot Nb\_D(i)}{Nb\_L(j)}$$

wherein,
Nb_Routes(i,j) represents the number of routes generated by communications of the type i for a j link type;
Nb_S(i) represents the number of source nodes for communications of type i;
Nb_D(i) represents the number of possible destination nodes for communications of type i; and
Nb_L(j) represents the number of link whose type is j.

Table 1, given in annex, details the number of routes per links generated for each communication pattern on all types of links for an optimal routing of the fat-tree topology illustrated on FIG. 2.

For sake of illustration, the number of routes between two computation nodes connected to a same L1 switch is computed as follows:

$$Nb\_Routes(i, j) = \frac{Nb\_S(i) \cdot Nb\_D(i)}{Nb\_L(j)} = \frac{18 \times 17}{18} = 17$$

wherein i represents a communication of the intra cell type and j represents the type of link between computation nodes and L1 switches.

Likewise, the number of routes between two computation nodes connected to a same L2 switch via different L1 switches is computed as follows:

$$Nb\_Routes(i, j) = \frac{Nb\_S(i) \cdot Nb\_D(i)}{Nb\_L(j)} = \frac{(32 \times 18) \times (31 \times 18)}{32 \times 18} = 558$$

wherein i represents a communication of the intra island type and j represents the type of link between computation nodes and L1 switches.

The column entitled "Total" of Table 1 gives the number of routes for all the communication types and a particular type of link.

The column entitled "Nb links", corresponding to the Nb_L(j) variable, gives the number of links for a particular type of link. For example, considering the link between computation nodes and L1 switches, the number of links is computed as follows:

$$Nb\_Links = 18 \times 32 \times 6 = 3456$$

wherein 18 represents the number of computation nodes connected to a L1 switch, 32 represents the number of switches per computation island, and 6 represents the number of islands.

The results obtained from Table 1 represent an optimal configuration that could be obtained from the network topology illustrated on FIG. 2. Such results can be represented on a two dimensional plot representing the network load wherein the X axis represents the number of routes per link and the Y axis represents the number of links in the interconnect network that are associated to this number of routes per link, referred to as the link count in the following.

To that end, each couple of number of routes per link and link count are represented as optimal routing points. FIG. 3 depicts a graph 300 illustrating such a representation of the optimal routing for the network illustrated on FIG. 2. For sake of clarity the ordinates are represented according to a logarithmic scale.

It should be noted here that since the numbers of routes per link are calculated for each switch port, all the links appear twice apart from the links located between the nodes and leaf switches. Therefore, to compare numbers of routes per link and numbers of links, the number of links between the L1 and L2 types and between the L2 and L3 types should be multiplied by a factor of two.

According to the obtained number of routes per link given in Table 1, four points are deemed to represent optimal routing points, that is to say the points having as abscissa 3456, 3582, 3599, and 24192. From this four abscissa, it is possible to determine the four corresponding ordinates 144, 7200 ((3456+144)×2), 3600 (3456+144), and 432, respectively. These four optimal routing points are referred to as 305, 310, 315, and 320, respectively.

The first optimal routing point 305 corresponds to links between L2 switches of the service island and L3 switches, the second optimal routing point 310 corresponds to links between L1 and L2 switches, the third optimal routing point 315 corresponds to links between nodes and L1 switches, and the fourth optimal routing point 320 corresponds to links between L2 switches of the computation island and L3 switches.

It should be observed here that the number of optimal routing points can be equal to up to the number of link types.

Once the optimal routing configuration has been characterized, it can be used to evaluate network topologies and routing according to the same scheme.

To simulate the network topologies and therefore routing, an Infiniband network simulator can be used, for example the ibsim software developed by the company Voltaire. Ibsim uses a net list to simulate the management behaviour of the network that is to say routing, performance counters and the likes. Even if it cannot be used directly to assess the impact real traffic, OpenSM can be plugged to ibsim in order to configure the virtual interconnections used to assess the routing quality. To assess the routing efficiency, new functionalities are added to the OpenSM console in order to generate the routes per link values. The pseudo code 1 given in the annex illustrates an example of such functionalities to obtain, after routing, the number of routes per link, that is to say the values of "route counter" and the corresponding number of links that is to say the values of "link count".

The number of routes per link is preferably determining for each type of link according to the types used for estimating the optimal routing points. For example, the number of routes per link can be evaluated for the links between computation nodes and L1 switches, the links between L1 and L2 switches, and the links between L2 and L3 switches, for the computation and service islands.

Such results can be aggregated, as disclosed above, in reference to the determination of the optimal values so as to obtain actual routing points for the topology and routing of the simulated network.

Figure 4:
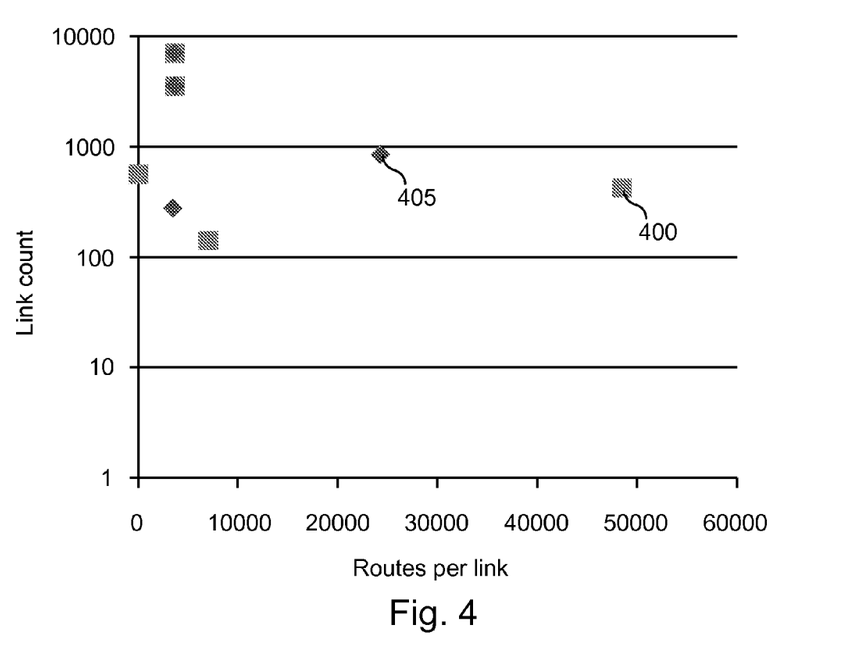
FIG. 4 depicts a graph illustrating a representation of actual routing obtained with the min-hop and fat-tree algorithms for the network topology illustrated on FIG. 2, compared with a representation of the optimal routing for the network as shown on FIG. 3.

For sake of illustration, the actual routing points obtained with the min-hop and fat-tree algorithms for the network topology illustrated on FIG. 2 are depicted on FIG. 4 along with the optimal routing points as shown on FIG. 3.

The diamond marks represent the actual routing points obtained with the min-hop algorithm while the square marks represent the actual routing points obtained with the fat-tree algorithm. It should be noted that the optimal routing points are not visible since they are superimposed on the square marks representing the actual routing points obtained with the fat-tree algorithm.

To analyze these results, it is assumed that a link is oversubscribed when its number of routes is greater than the optimal value, that it is undersubscribed when its number of routes is less than the optimal value and that the optimal network bandwidth is achieved when the number of routes going through each link is equal to its optimal value.

In view of this, the optimal bandwidth is achieved when there are no oversubscribed or undersubscribed links that is to say when actual routing points are as close as possible to the optimal routing points. For instance, by comparing the performance of the min-hop and fat-tree routing algorithms, it appears that the number of routes per link is equal to the optimal values for the fat-tree algorithm. However, the min-hop algorithm does not route the packets in an optimal manner since, for example, the actual routing point 400, characterizing about 50,000 routes per link, is equal to about twice the greatest number of routes per link of the optimal routing point 405 (representing the greatest number of routes per link of the optimal routing points).

The method of the invention for evaluating the efficiency of a network topology and routing may also be used to analyze its efficiency when one or more switches and/or links experience failures. In other words, the numbers of routes per link enables to assess the routing efficiency of a given routing algorithm on a specific interconnect architecture. It provides an estimate of how well a fully populated network is routed. To that end, a simulation is launched on the fully populated cluster. Once all the routes have been established, one or more items of equipment are removed from the simulated topology. This causes OpenSM to reroute the network, and therefore, to adapt the routes to the new situation. This has direct effects upon the number of routes per link, which can be measured using the methodology described above.

When simulating the failure of an element, for example a switch, an elementary simulation is done for each element that can experience a failure. For example, 400 elementary simulations should be done if the failure of a switch is simulated in a network comprising 400 switches. For each elementary simulation, results are aggregated to determine the corresponding actual routing points. According to a preferred embodiment, the actual routing points of all the simulation are then reported on the graph comprising the optimal routing points so as to estimate the efficiency of the network topology and routing when an element experiences a failure.

Figure 5:
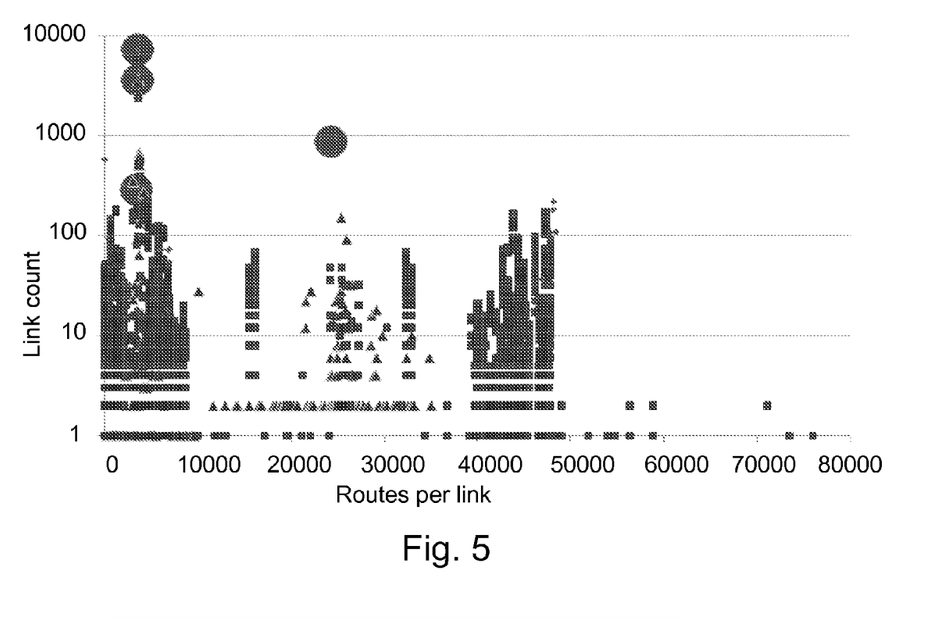
FIG. 5 illustrates an example of a graph representing optimal routing points and actual routing points resulting from the simulation of the failure of one switch using min-hop routing algorithm and the fat-tree network topology depicted on FIG. 2.

FIG. 5 illustrates an example of a graph representing optimal routing points and actual routing points resulting from the simulation of the failure of one switch using min-hop routing algorithm and the fat-tree network topology depicted on FIG. 2. Circular marks represent the optimal routing points, diamond marks represent the actual routing points when a failure is simulated in one L1 switch, square marks represent the actual routing points when a failure is simulated in one L2 switch, and triangular marks represent the actual routing points when a failure is simulated in one L3. As can be seen, the highest number of routes per link that is reached is greater than 70,000 routes per link, which is three times the optimal value, 576 links are not used at all, and many links are oversubscribed (square marks in the 40.000-50.000 routes per link range). As a conclusion, the min-hop algorithm performs very badly in a degraded network.

Similarly, it is possible to simulate the failure of more than one equipment of the network, such as the failure of two switches. Again, an elementary simulation is done for each possible combination. For example, 159000 (400×399) elementary simulations should be done if the failure of two switches is simulated in a network comprising 400 switches.

In view of the number of elementary simulations, a third dimension, representing the number of occurrences of the point across the elementary simulations, is preferably assigned to each actual routing point when simulating the failure of more than one element. Such third dimension may be represented on the graph with colours. For sake of illustration, blue can be used to represent actual routing points resulting from 0 to 33 elementary simulations, yellow can be used to represent actual routing points resulting from 34 to 1148 elementary simulations, green can be used to represent actual routing points resulting from 1149 to 6689 elementary simulations, and so on.

To assess the routing efficiency, the most loaded link, the least loaded link, and the actual routing point scattering can be analyzed.

The link that is the most oversubscribed, that is to say the link that corresponds to the highest value along the X axis (representing the number of routes per link), can be considered as characterizing the stability of the network. The higher this value is, the more unstable the routing is and the more sensitive to contention the network is.

The link that is the most undersubscribed, that corresponds to the lowest value along the X axis (representing the number of routes per link), can be considered as representing the network performances. The lower this value is, the lower the achieved performance will be. In the worst case, the number of routes per link can be null, which means that one or more links are not used at all by the routing algorithm.

An efficient routing algorithm should always try to keep the number of routes per link as close as possible to the optimal values. Consequently, the actual routing points should always be as close as possible to the optimal routing points along the X axis. It has been observed that scattered data along the Y axis is less important than along the X axis.

The method of the invention can also be used to choose the routing algorithm and to improve the estimation of routing algorithm parameters as well as to determine optimal network topologies by comparing simulation results.

Figure 6:
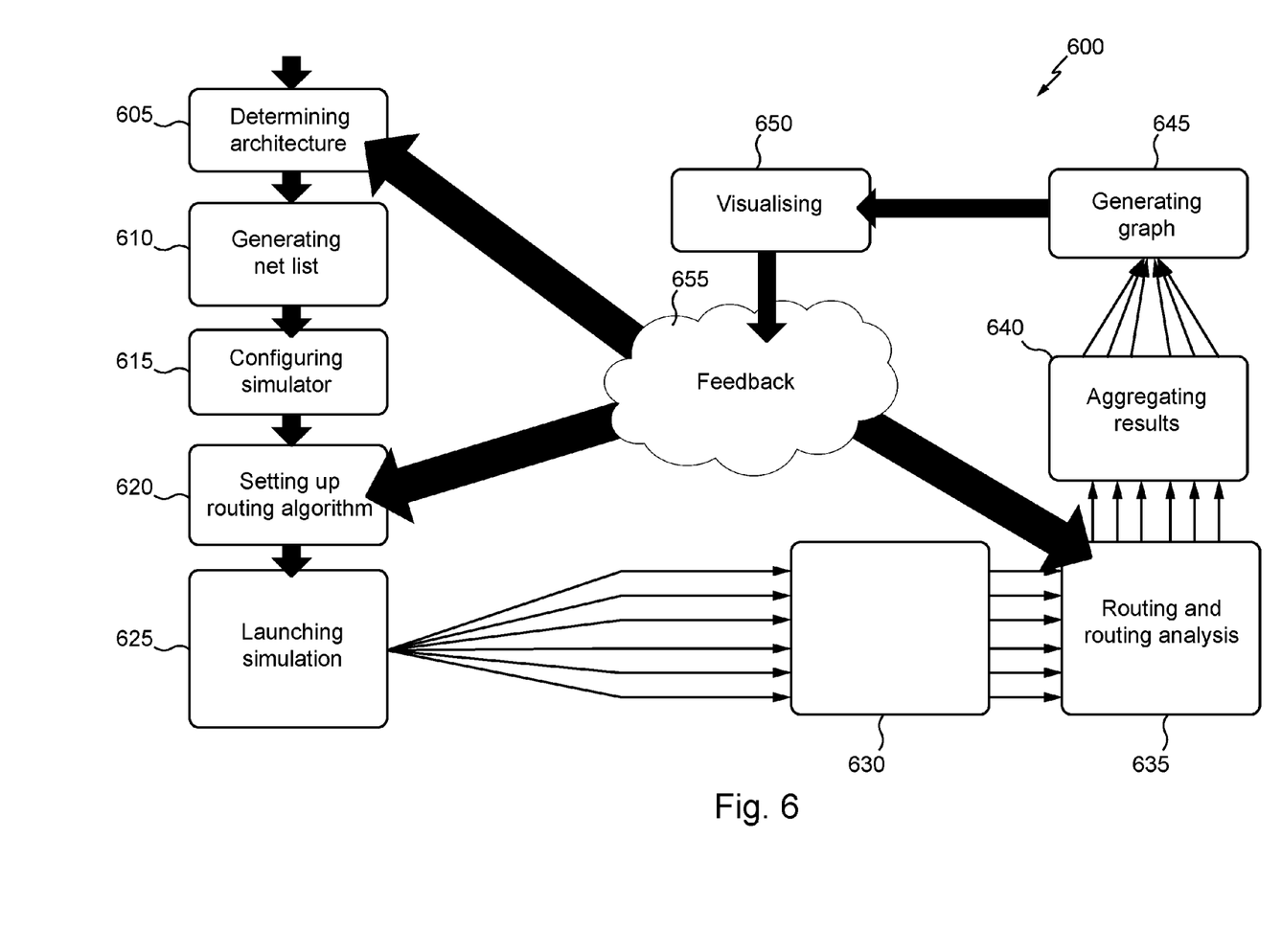
FIG. 6 illustrates an example of an algorithm that can be used to improve a network topology and routing based on simulations.

FIG. 6 illustrates an example of an algorithm 600 that can be used to improve a network topology and routing based on simulations. For sake of efficiency, the simulations are preferably executed on a cluster.

After having determined a network architecture (step 605), a net list is generated from the network architecture, for example by converting the electronic file representing the network architecture, to generate a net list that represents all the links between the nodes and switches (step 610).

The generated net list is then transmitted to the network simulator, for example ibsim, that is configured accordingly (step 615). From this configuration, the routing parameters can be set up (step 620).

Once the network topology is configured in the simulator and the routing algorithm is set-up, the elementary simulations can be launched (step 625). The number of elementary simulations that can be simultaneously executed depends upon the cluster used for simulation.

Once the simulation processes have been dispatched on the cluster nodes (step 630), a first step of the simulation is a routing step (step 635). The number of routes per link and the link counts are preferably evaluated during the simulation as described above by reference to pseudo code 1.

The obtained results are then aggregated (step 640) so as to determine the actual routing points that can be plotted on a graph (step 645) and displayed (step 650).

Preferably, the optimal routing points are also evaluated (not represented) so as to be plotted on the displayed graph.

By comparing the actual routing points with the optimal routing points, it is possible to estimate the efficiency of the simulated network topology and routing. Likewise, by comparing the actual routing points of simulations corresponding to different network topologies, routing algorithms, and/or parameters of the used routing algorithm, that is to say by repeating steps 605 to 650 for different network topologies, routing algorithms, and/or routing parameters, it is possible to compare the efficiency of different network configurations.

In response to the observed graph, it is possible to modify the network configuration to improve its efficiency according to three types of parameters related to the network topology, the routing parameters, and the routing algorithms (step 655). If the network topology is to be modified, the algorithm is branched to step 605, if the routing parameters are to be modified, the algorithm is branched to step 620, and if the routing algorithm is to be modified, the algorithm is branched to step 635.

Therefore, by running different simulations and by comparing the results according to the method of the invention, it is possible to optimize the interconnection efficiency of parallel computer networks based upon static routing schemes.

Figure 7:
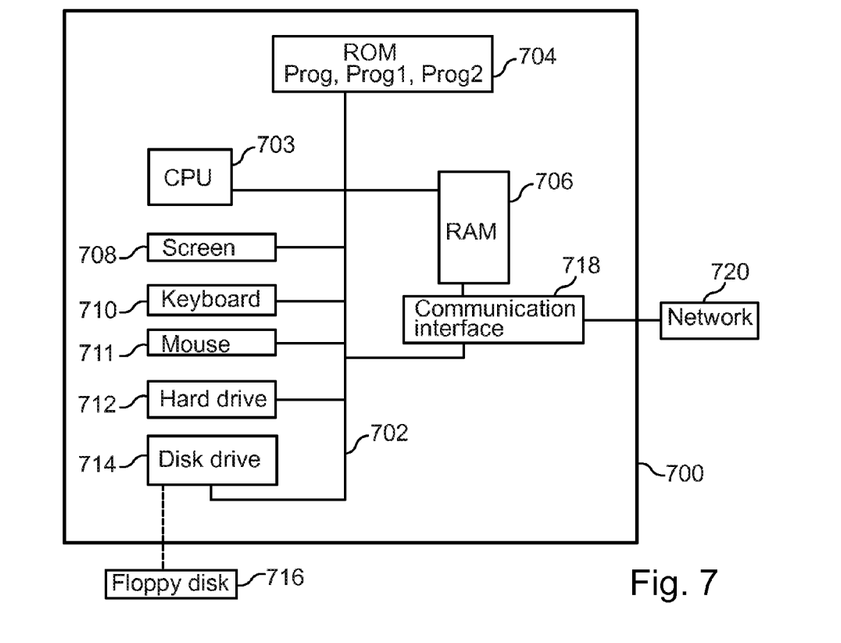
FIG. 7 illustrates an example of an apparatus making it possible at least partially to implement the invention.

An apparatus implementing the invention is illustrated in FIG. 7. The device 700 is for example a micro-computer or a workstation.

The apparatus 700 comprises a communication bus 702 to which there are connected:
- a central processing unit or microprocessor 703 (CPU);
- a read-only memory 704 (ROM) able to contain the programs "Prog", "Prog1" and "Prog2";
- a random access memory or cache memory (RAM) 706, comprising registers adapted to record variables and parameters created and modified during the execution of the aforementioned programs; and
- a communication interface 718 connected to a distributed communication network 720, for example the Internet, the interface being able to transmit and receive data. In particular, the communication interface 718 allows exchange of data with the nodes of a service island.

Optionally, the apparatus 700 may also have:
- a screen 708 for viewing data and/or serving as a graphical interface with the user, who will be able to interact with the programs according to the invention, using a keyboard 710 or any other means such as a pointing device, for example a mouse 711, an optical stylus, a touch screen or a remote control device;
- a hard disk 712 able to contain the aforementioned programs "Prog", "Prog1" and "Prog2" and data processed or to be processed according to the invention;
- a disk drive 714 adapted to receive a floppy disk 716 and to read or write thereon data processed or to be processed according to the invention; and
- a reader for memory cards adapted to read or write thereon data processed or to be processed according to the invention.

The communication bus affords communication and interoperability between the different elements included in the apparatus 700 or connected to it. The representation of the bus is non-limiting and, in particular, the central processing unit is capable of communicating instructions to any element of the apparatus 700 directly or by means of another element of the apparatus 700.

The executable code of each program enabling the programmable apparatus to implement the processes according to the invention may be stored, for example, on the hard disk 712 or in read-only memory 704.

According to a variant, the floppy disk 716 can contain data as well as the executable code of the aforementioned programs which, once read by the apparatus 700, will be stored on the hard disk 712.

As a second variant, the executable code of the programs can be received by the intermediary of the communication network 720, via the interface 718, in order to be stored in an identical fashion to that described previously.

The floppy disks can be replaced by any information carrier such as a compact disc (CD-ROM) or a memory card. Generally, the floppy disks may be replaced by information storage means, which can be read by a computer or microprocessor, integrated or not into the apparatus, which may possibly be removable, and which are adapted to store one or more programs whose execution permits the implementation of the method according to the invention.

More generally, the program or programs may be loaded into one of the storage means of the apparatus 700 before being executed.

The central processing unit 703 will control and direct the execution of the instructions or portions of software code of the program or programs according to the invention, these instructions being stored on the hard disk 712 or in the read-only memory 704 or in the other aforementioned storage elements. On powering up, the program or programs which are stored in a non-volatile memory, for example the hard disk 712 or the read-only memory 704, are transferred into the random-access memory 706, which then contains the executable code of the program or programs according to the invention, as well as registers for storing the variables and parameters necessary for implementation of the invention.

It should be noted that the communication apparatus comprising the device according to the invention can also be a programmed apparatus. This apparatus then contains the code of the computer program or programs for example fixed in an application specific integrated circuit (ASIC).

Naturally, in order to satisfy local and specific requirements, a person skilled in the art may apply to the solution described above many modifications and alterations all of which, however, are included within the scope of protection of the invention as defined by the following claims.

In particular, the network of which the efficiency is estimated can comprise other items of equipment than nodes and switches. In such network, the types of links are estimated according to the used equipment, their nature, and the nature of the links between those items of equipment.

Annex

TABLE 1

| Type of comm./ type of link | Intra cell | Intra island | Inter island | I/O | Total | Nb links |
|---|---|---|---|---|---|---|
| Computation islands | | | | | | |
| Nodes <-> L1 | 17 | 558 | 2880 | 144 | 3599 | 3456 |
| L1 <-> L2 | N/A | 558 | 2880 | 144 | 3582 | 3456 |
| L2 <-> L3 | N/A | N/A | 23040 | 1152 | 24192 | 432 |
| Service island | | | | | | |
| Nodes <-> L1 | 17 | 126 | N/A | 3456 | 3599 | 144 |
| L1 <-> L2 | N/A | 126 | N/A | 3456 | 3582 | 144 |
| L2 <-> L3 | N/A | N/A | N/A | 3456 | 3456 | 144 |

Pseudo code 1:

```
for all the nodes i in the network; do
    for all the nodes j in the network, i being different from j; do
        get the route from i to j
        for all the links l in the route from i to j; do
            increment the route counter for l by 1
        done
    done
done
for all the links l; do
    get the route counter c of l
    increment the link count r of c by one
done
```

The invention claimed is:

1. A method of characterizing a theoretical interconnection efficiency of a parallel computer network based upon a static routing scheme, the parallel computer network comprising a plurality of items of equipment, the method comprising:
   determining a plurality of types of links between said items of equipment; and
   for each type of at least one subset of said plurality of types of links:
      determining, via a processor, a theoretical number of routes per link according to the topology of said parallel computer network, and
      determining, via a processor, the associated number of links according to the topology of said parallel computer network; and
   aggregating, via a processor, said determined theoretical number of routes per link and said associated number of links, by determining the number of links that are associated to each calculated value of routes per link, regardless of the link type, to estimate at least one optimal routing point defined by a couplet of the number of routes per link and said number of links, said at least one estimated optimal routing point characterizing the theoretical efficiency of said parallel computer network;
   for each type of said at least one subset of said plurality of types of links,
      determining the actual number of routes per link according to the topology of said parallel computer network and to said routing algorithm, and
      determining the associated actual number of links according to the topology of said parallel computer network; and aggregating said determined actual number of routes per link and said associated actual number of links to estimate at least one actual routing point, said at least one estimated actual routing point characterizing the efficiency of said parallel computer network in view of said at least one optimal routing point;
   further comprising modifying at least one parameter of said topology and repeating:
   for each type of said at least one subset of said plurality of types of links:
      determining the modified actual number of routes per link according to the modified topology of said parallel computer network and to said routing algorithm; and
      determining the modified associated actual number of links according to the modified topology of said parallel computer network; and
   aggregating said determined modified actual number of routes per link and said modified associated actual number of links to estimate at least one modified actual routing point, said at least one estimated modified actual routing point characterizing the efficiency of said modified parallel computer network in view of said at least one optimal routing point and/or of said at least one actual routing point.

2. The method according to claim 1 further comprising plotting said at least one optimal routing point on a graph.

3. The method according to claim 1, wherein said modifying said topology comprises logically removing at least one equipment of said parallel computer network.

4. The method according to claim 3, further comprising repeating estimating said at least one modified actual routing point for simulating the failure of an equipment of said at least one equipment type.

5. The method according to claim 1, further comprising plotting said routing points on a same graph.

6. The method according to claim 1, wherein said at least one subset of said plurality of types of links comprises all the types of links of said plurality of types of links.

7. The method according to claim 3, wherein determining an actual number of routes per link and determining an associated actual number of links are executed during the simulation of said parallel computer network.

8. A non-transitory computer readable medium comprising instructions which, when executed cause the method of claim 1 to be executed.

9. An apparatus configured to perform the method of claim 1.

* * * * *